Patented July 31, 1945

2,380,477

UNITED STATES PATENT OFFICE 2,380,477

CATALYSTS FOR THE ADDITION POLYMERIZATION OF UNSATURATED ORGANIC COMPOUNDS

William D. Stewart, Akron, Ohio, assignor to The B. F. Goodrich Company, New York, N. Y., a corporation of New York No Drawing. Application February 19, 1941,
Serial No. 379,717

18 Claims. (Cl. 260—84.5)

This invention relates to the polymerization of unsaturated organic compounds which are capable of undergoing an addition polymerization to form high molecular weight linear polymers, more particularly to the polymerization of conjugated butadienes either alone, in mixtures with one another or with other polymerizable comonomers such as the vinyl and vinylidene compounds. The principal object of the invention is to provide a new class of catalysts or accelerators of polymerization by the use of which improved polymers may be obtained in increased yield and in a much shorter interval of time.

It is known that addition polymerizations may be initiated and promoted by the presence of various substances among which are oxygen and oxygen yielding compounds such as hydrogen peroxide, organic peroxides and per-salts. However, with the use of such known initiators considerable difficulty is still experienced in obtaining high yields of a desirable polymer in a short interval of time. Particularly in the commercial manufacture of polymers by emulsion polymerization, the production schedule is frequently disrupted by slow reactions and long induction periods before the polymerization starts.

I have now discovered a large number of substances which have been termed redox systems because of their property of catalyzing or promoting oxidation reduction reactions, particularly those occurring in biological processes, which substances are quite effective in promoting addition polymerizations and which are vastly superior to any previously described polymerization initiators or accelerators in that the polymerization is carried out in a much shorter time, the induction period is largely eliminated, lower temperatures for the polymerization may be employed and consequently a higher molecular weight more linear polymer possessing more desirable properties is obtained.

The class of redox systems with which the present invention is concerned is that class which is composed of naturally occurring compounds of the cyclopentenophenanthrene group having a heavy metal salt combined therewith. Among the naturally occurring compounds of the cyclopentenophenanthrene group which, when combined with a heavy metal salt as hereinafter described, are effective as polymerization accelerators there may be mentioned the sterols such as cholesterol, coprosterol, zymosterol, stigmasterol, ergosterol, sitosterol, ostreasterol, lanosterol, agnosterol, scymnol and the like; the bile acids including those occurring in ox bile such as lithocholic acid, desoxycholic acid, cholic acid, and the like, those occurring in human bile such as anthropodesoxycholic acid and other bile acids occurring in the bile of other animals such as ursodesoxycholic acid (bear bile), bufodesoxycholic acid (toad bile), hyodesoxycholic acid (pig bile) and nutriacholic acid (beaver bile); the sapogenins of the cholane saponins such as tigogenin gitogenin, digitogenin, sarsapogenin and the like; the aglycones of the vegetable cardiac poisons such as digitaligenin, gitoxigenin and the like; the toad poisons such as bufotalin; and the sex hormones such as androsterone, testosterone, oestrone and progesterone. These compounds are all related chemically since they contain the cyclopentenophenanthrene ring structure

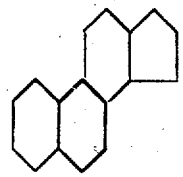

and all have substituents present at both the $C_3$ position and the $C_{17}$ position, the substituent at the $C_3$ position containing an oxygen atom. The chemical relationship of these compounds may be shown by the following table which sets forth their chemical structure in a general way:

| Type of compound | Substituent at $C_3$ position | Substituent at $C_{17}$ position | Other substituents or variations in the cyclopentenophenanthrene nucleus |
|---|---|---|---|
| Sterols | —OH | Saturated or unsaturated aliphatic hydrocarbon side chain containing 8–11 carbon atoms. | Double bond between $C_5$ and $C_6$; $CH_3$ groups at $C_{10}$ and $C_{13}$. |
| Bile acids | —OH | Saturated or unsaturated side chain containing 7–9 carbon atoms having A—C—OH group. $\parallel$ O | Other —OH groups at other positions. $CH_3$ groups at $C_{10}$ and $C_{13}$. |
| Sapogenins of cholane saponins | —OH | Eight carbon atom side chain containing two ethereal oxygen atoms. | Other —OH groups at other positions. |
| Aglycones of vegetable cardiac poisons | —OH | Eight carbon atom side chain containing ethereal oxygen atom and a ketonic oxygen atom. | Other —OH groups principally at $C_5$, $C_{11}$ and $C_{14}$ positions. |
| Toad poisons | —OH | Same as for aglycones of vegetable cardiac poisons. | Other —OH groups at other positions. |
| Sex hormones | =O | =O, —OH, —C—CH₃ or similar group. $\parallel$ O | Double bond between $C_4$ and $C_5$. |

As hereinabove stated these naturally occurring compounds of the cyclopentenophenanthrene groups are effective in promoting polymerizations when combined with a heavy metal compound. The term "heavy metal" as used herein is meant to include metallic elements which have a density greater than four, an atomic weight greater than forty and a low atomic volume (ratio of atomic weight to density) and consequently appear substantially at the minimum points above an atomic weight of forty on Lothar Meyer's curve of atomic volumes. (See any standard textbook of inorganic chemistry such as Ephraim, "Textbook of Inorganic Chemistry," page 30, or Caven and Lander, "Systematic Inorganic Chemistry," facing page 30.) The term "heavy metal" includes, therefore, those metallic elements appearing in the center positions of the long periods of a periodic table arranged in short and long periods, and especially those occurring in the 6th to 12th positions of the long periods (considering the alkali metals to occupy the first position and all the rare earth metals to occupy a single position), that is, the elements occurring in group VIII of the Mendeleef Periodic Table such as iron, cobalt and nickel, those in subgroup B of groups I and II of the Mendeleef Periodic Table such as copper, silver, zinc, cadmium and mercury, and those in subgroup A of groups VI and VII of the Mendeleef Periodic Table such as chromium, manganese and molybdenum.

The class of redox systems of this invention is meant to include broadly those systems which contain any of the heavy metals mentioned above in the form of one of its salts combined with any of the cyclopentenophenanthrene type compounds mentioned above. The metal salt may be combined with the sterol or similar compound either chemically as in a naturally occurring preparation known to contain both the cyclopentenophenanthrene type compound and a heavy metal salt where the two may be chemically combined in a complex compound of uncertain chemical structure, or the combination may be physical in which latter event the system will consist of a mixture of the metal in the form of one of its simple salts together with the cyclopentenophenanthrene type compound itself or some naturally occurring substance which contains the compound or one of its derivatives. For example, a mixture of a heavy metal salt such as cobalt chloride and cholesterol or a lipid which yields cholesterol on hydrolysis may be employed, or cobalt chloride may be used together with an animal bile known to contain bile acids or with glucosides from certain plants which are known to contain either saponins of the cholane group which yield sapogenins on hydrolysis or cardiac poisons which yield their aglycones on hydrolysis. Water soluble redox systems containing a sterol or a bile acid combined with a water soluble salt of a commonly occurring heavy metal which is essential to life and occurs in the 6th to 12th positions of the first long period of the periodic table such as iron, cobalt, nickel, copper and manganese, are preferred.

In the practice of this invention monomeric compounds or mixtures of monomers are polymerized by well known methods of polymerization such as by polymerization in homogeneous systems or by polymerization in emulsions in presence of catalytic amounts of the redox systems of this invention. In the emulsion polymerization process which is at present preferred, the monomer or monomer mixture is emulsified in a non-solvent liquid, usually water, with the aid of an emulsifying agent and polymerization is then effected by adding the system containing a heavy metal and a sterol or related compound together, if desired, with various other substances, the nature of which will be described hereinafter, and agitating the emulsion until polymer is formed. The resulting polymerized emulsion containing polymer particles dispersed in a liquid medium greatly resembles natural rubber latex and may be coagulated in the usual manner to yield the solid polymer.

The amount of the redox systems to be used in polymerization may be varied over rather wide limits provided that an excessive amount of the redox system does not inhibit or poison the polymerization reaction. For most purposes only very small amounts of the redox system, say less than 2% by weight based on the weight of the monomers are employed and in most instances the polymerization proceeds most rapidly when from 0.05 to 1% of the redox system is present. When the sterol or related compound and heavy metal are added as separate compounds a mixture of about .5% of the sterol and 0.1% of the heavy metal salt is preferred. When using some heavy metals, particularly copper and manganese, however, it is desirable to use even smaller concentrations of the heavy metal salt, less than .1%, since these metals in higher concentration tend to inhibit the polymerization.

As has been mentioned hereinabove, the redox systems of this invention may be used, generally, in the polymerization of these unsaturated organic compounds which are capable of undergoing an addition polymerization to form a high molecular weight linear polymer. Included in this class of monomers are the conjugated butadienes such as butadiene, isoprene, dimethyl butadiene, chloroprene, piperylene and the like all of which contain a

group; monomer mixtures of two or more of these butadienes such as a mixture of butadiene and dimethyl butadiene; and monomer mixtures of one or more of these conjugated butadienes with one or more other compounds which also contain a

group and copolymerize with conjugated butadienes such as mixtures of butadiene with vinyl compounds including aryl olefins and substituted aryl olefins such as styrene, p-chloro styrene, p-methoxy styrene, vinyl naphthalene and the like, acrylic and methacrylic acids, esters, nitriles and amides such as acrylic acid, acrylonitrile, methacrylonitrile, methyl acrylate, methyl methacrylate, butyl acrylate, methacrylamide and the like and other vinyl compounds such as vinyl ketones, vinyl ethers, vinyl carbazole, vinyl furane and the like. Monomer mixtures of butadienes with other compounds containing a

group such as vinylidene chloride and the like may also be used. All these monomers and monomer mixtures when polymerized or copolymerized in the manner herein described form high molecular weight linear polymers. When the conjugated butadiene is the monomer or is the predominant constituent of a monomer mixture such polymers are rubbery in character and may be called synthetic rubber.

Other monomers or monomer mixtures which are capable of undergoing an addition polymerization and which may be used in the process of this invention are the above-mentioned vinyl and vinylidene compounds as well as other vinyl compounds such as vinyl chloride and vinyl acetate, either alone or in mixtures with one another, all of which polymerize to yield a linear polymer of a thermoplastic resinous character.

The redox systems of this invention containing a heavy metal and a sterol or related compound may be used in the polymerization of monomers in emulsions prepared with various emulsifying agents and containing various other catalysts, initiators, promoters, accelerators or modifiers of polymerization. As emulsifying agents, partially neutralized fatty acid soaps such as 70–90% neutralized myristic or palmitic acid are particularly effective but other well known emulsifying agents including completely neutralized fatty acid soaps such as sodium oleate and sodium palmitate and hymolal sulfates or sulfonates such as sodium lauryl sulfate and sodium isobutyl naphthalene sulfonate may also be employed.

The redox systems containing a sterol or related compound and a heavy metal salt are preferably used to accelerate polymerization initiated with an oxygen yielding compound such as hydrogen peroxide, benzoyl peroxide, potassium persulfate, sodium perborate, potassium percarbonate and the like, but may also be employed with other known polymerization initiators such as diazoaminobenzene, trichloracetic acid and carbon tetrachloride. The redox systems of this invention may also be used advantageously in polymerizations which employ a reducing agent such as sulfur dioxide as the polymerization initiator, or in polymerizations effected in presence of both an oxidizing and a reducing agent. Moreover the redox systems disclosed herein may be used to effect polymerizations carried out in the absence of an added initiator, such polymerizations being incapable of proceeding without the redox system. They may also be employed in the polymerization of emulsions containing a polymerization modifier such as the dialkyl dixanthogens, diaryl disulfides, thiuram disulfides and other sulfur containing compounds known to increase the solubility and plasticity of polymers.

Although the exact manner in which the redox systems containing a sterol or related compound and a heavy metal accelerate polymerization is not known with certainty, it is believed that the redox system promotes or catalyzes an oxidation reduction reaction which oxidizes or activates the monomer molecules to such an extent that they are then capable of initiating a chain reaction which produces a linear polymer. The redox system may directly catalyze the oxidation of the monomer by an oxidizing agent such as a peroxide, if such is present, or it may be auto-oxidizable, and be capable of inducing monomer oxidation or activation by an oxidation reduction involving the redox system itself, or some other mechanism may be responsible for the increase in the rate of polymerization and for the improved properties of the polymerization products. The association of small amounts of heavy metals with various physiologically active compounds such as those of the cyclopentenophenanthrene type in biological systems which undergo oxidoreduction is well known and many theories have been propounded for an explanation of such biological oxidoreductions. Since it is believed that the initiation of polymerization reactions is quite similar to biological oxidation reductions particularly as regards the role of the redox catalyst, analogies of polymerization systems with biological systems have proved of great value in elucidating the action of the redox systems of this invention. It is to be understood however, that the invention is not to be limited by any proposed theory since the inclusion of the substances herein described and herein designated as redox systems in polymerization mixtures greatly accelerates the process and also improves the quality of the polymerization products.

In order to illustrate the practice of this invention and to show the accelerating effect of the redox systems of this invention upon polymerization, an emulsion containing the following ingredients is prepared.

| | | |
|---|---|---|
| Butadiene | g | 55 |
| Acrylonitrile | g | 45 |
| Hydrogen peroxide (3½% solution) | cc | 10 |
| Emulsifying solution (2% aqueous solution of myristic acid 85% neutralized with NaOH) | cc | 250 |
| Polymerization modifier | g | 0.3 |

This emulsion is then divided into equal parts and redox systems added to the emulsion as follows:

(1) No redox system added—control
(2) 0.05% by weight of ferrous ammonium sulfate—control
(3) 0.05% by weight (based on monomers) of ferrous ammonium sulfate
    0.50% by weight (based on monomers) of cholesterol
(4) 0.05% by weight of ferrous ammonium sulfate
    0.50% by weight of ox bile
(5) 0.05% by weight of cobalt chloride
    0.50% by weight of ox bile
(6) 0.001 by weight of cuprous chloride
    0.50% by weight of cholesterol
(7) 0.10% by weight of cuprous chloride The emulsions are then placed in sealed glass tubes and rotated at 30° C. At various intervals the percent yield of polymer is determined. The rate of polymerization for the various tubes is shown as follows:

| Tube | Per cent yield after 7½ hours | Per cent yield after 10½ hours | Per cent yield after 12½ hours | Per cent yield after 23 hours | Per cent yield after 45 hours |
|---|---|---|---|---|---|
| (1) | 0 | 0 | 0 | 45 | 94 |
| (2) | 0 | 7 | 38 | 94 | |
| (3) | 23 | 76 | 94 | | |
| (4) | 20 | 75 | 92 | | |
| (5) | 30 | 82 | 90 | | |
| (6) | 26 | 81 | 91 | | |
| (7) | 0 | 0 | 0 | 0 | 0 |

It may be seen that with no redox system added, the polymerization is not started after 12½ hours and is not complete until 45 hours; with an iron salt alone, 23 hours are required; while with the redox systems of this invention containing a heavy metal salt and a sterol or a bile acid, polymerization is substantially complete after only 12½ hours. With a copper salt alone, there is no polymerization even after 45 hours, but with a copper salt and cholesterol polymerization was substantially complete in 12½ hours.

Other embodiments of the invention in which various other compounds of the cyclopentenophenanthrene type are used with various heavy metals and with various monomer mixtures, initiators, and emulsifying agents also show that the polymerization velocity is increased by the practice of this invention. It is even possible to polymerize a butadiene vinyl type comonomer mixture in an aqueous emulsion containing only a heavy metal salt and a sterol or bile acid without any initiator other than molecular oxygen being present and in the absence of any added emulsifying agents. This is possible because the sterols and bile acids in addition to their accelerating effect also act as emulsifying or solubilizing agents to emulsify the monomers in the aqueous phase. It is sometimes advantageous therefore to employ sterols or animal bile in polymerization mixtures containing other redox systems which contain a heavy metal salt combined with other compounds including sodium pyrophosphate, levulinic acid, beta mercapto ethanol and quebrachitol such as are disclosed in copending applications of William D. Stewart, Serial Nos. 379,713 to 379,716, inclusive, filed Feb. 19 1941, since the presence of these substances aid in the formation of an emulsion which more closely resembles the emulsions present in biological systems. However, it is understood that the use of bile or bile salts as emulsifying agents is known to the art and hence no claim is made on this feature of the invention.

Although various embodiments of the invention have been herein disclosed, it is not intended that the invention be limited solely thereto for it will be obvious to those skilled in the art that many modifications and variations are within the spirit and scope of the invention as defined by the appended claims.

I claim:

1. The method which comprises subjecting a polymerizable material consisting of at least one unsaturated organic compound which contains a

group and which undergoes in aqueous emulsion an addition polmerization to form a high molecular weight linear polymer, to polymerization in aqueous emulsion in the presence of a catalyst comprising a water soluble heavy metal salt in combination with a naturally occurring compound containing a cyclopentenophenanthrene ring having a substituent containing no elements other than oxygen and hydrogen at the $C_3$ position, a substituent containing no elements other than carbon, hydrogen and oxygen at the $C_{17}$ position and no substituents containing elements other than carbon, hydrogen and oxygen at other positions, the total concentration of the heavy metal salt and the combined cyclopentenophenanthrene compound being less than 2% by weight of the material polymerized, and the concentration of the heavy metal salt being such that the polymerization proceeds more rapidly than in the absence of the heavy metal salt.

2. The method of claim 1 in which the material subjected to polymerization is a polymerizable conjugated butadiene.

3. The method of claim 1 in which the material subjected to polymerization is a mixture of a polymerizable conjugated butadiene and at least one other compound which contains a

group and is copolymerizable therewith in aqueous emulsion.

4. The method of claim 1 in which the material subjected to polymerization is a mixture of butadiene-1,3 and at least one copolymerizable vinyl compound.

5. The method which comprises subjecting a mixture of a polymerizable conjugated butadiene and at least one other compound which contains a

group and is copolymerizable therewith in aqueous emulsion, to polymerization in aqueous emulsion in the presence of a catalyst comprising a sterol combined with a water-soluble heavy metal salt, the total concentration of the sterol and the heavy metal salt being less than 2% by weight of the material polymerized and the concentration of the heavy metal salt being such that the polymerization proceeds more rapidly than in the absence of the heavy metal salt.

6. The method of claim 5 in which the heavy metal salt is a salt of a heavy metal occurring in the 6th and 12th positions of the first long period of the periodic table.

7. The method of claim 5 in which the heavy metal salt is a salt of a heavy metal occurring in group VIII and the first long period of the periodic table.

8. The method which comprises subjecting a mixture of butadiene-1,3 and at least one copolymerizable vinyl compound to polymerization in aqueous emulsion in the presence of a catalyst comprising cholesterol combined with a water-soluble salt of a heavy metal occurring in the 6th to 12th positions of the first long period of the periodic table, the total concentration of cholesterol and the heavy metal salt being less than 2% by weight of the material polymerized and the concentration of the heavy metal salt being such that the polymerization proceeds more rapidly than in the absence of the heavy metal salt.

9. The method of claim 8 in which the heavy metal salt is a salt of a heavy metal occurring in group VIII and the first long period of the periodic table.

10. The method of claim 8 in which the heavy metal salt is an iron salt.

11. The method of claim 8 in which the material polymerized is a mixture of butadiene-1,3 and acrylonitrile and the heavy metal salt is an iron salt.

12. The method which comprises subjecting a mixture of a polymerizable conjugated butadiene and at least one other compound which contains a

group and is copolymerizable therewith in aqueous emulsion, to polymerization in aqueous emulsion in the presence of a catalyst comprising a bile acid combined with a water soluble heavy metal salt, the total concentration of the bile acid and the heavy metal salt being less than 2% by weight of the material polymerized and the concentration of the heavy metal salt being such that the polymerization proceeds more rapidly than in the absence of the heavy metal salt.

13. The method of claim 12 in which the material polymerized is a mixture of butadiene-1,3 and at least one copolymerizable vinyl compound, and the heavy metal salt is a salt of a heavy metal occurring in the 6th to 12th positions of the first long period of the periodic table.

14. The method of claim 12 in which the catalyst comprises ox bile and a water-soluble salt of a heavy metal occurring in the 6th to 12th positions of the first long period of the periodic table.

15. The method of claim 12 in which the material polymerized is a mixture of butadiene-1,3 and acrylonitrile and the catalyst comprises ox bile and a water-soluble cobalt salt.

16. The method of claim 12 in which the material polymerized is a mixture of butadiene-1,3 and acrylonitrile and the catalyst comprises ox bile and a water-soluble copper salt.

17. The method which comprises subjecting a mixture of a polymerizable conjugated butadiene and at least one other compound which contains a

group and is copolymerizable therewith in aqueous emulsion, to polymerization in aqueous emulsion in the presence of a catalyst comprising a complex compound of a heavy metal and a compound containing a cyclopentenophenanthrene ring having a substituent containing no elements other than oxygen and hydrogen at the $C_3$ position, a substituent containing no elements other than carbon, hydrogen and oxygen at the $C_{17}$ position and no substituents containing elements other than carbon, hydrogen and oxygen at other positions, the concentration of the complex compound being less than 2% by weight of the material polymerized and such that the polymerization proceeds more rapidly than in the absence of the complex compound.

18. The method of claim 17 wherein the heavy metal is a heavy metal occurring in the 6th to 12th positions of the first long period of the periodic table.

WILLIAM D. STEWART.

Certificate of Correction

Patent No. 2,380,477. July 31, 1945.

WILLIAM D. STEWART

It is hereby certified that error appears in the printed specification of the above numbered patent requiring correction as follows: Page 4, second column, line 26, claim 6, for "6th and 12th" read *6th to 12th*; and that the said Letters Patent should be read with this correction therein that the same may conform to the record of the case in the Patent Office.

Signed and sealed this 5th day of November, A. D. 1946.

[SEAL]

LESLIE FRAZER,
*First Assistant Commissioner of Patents.* occurring in the 6th to 12th positions of the first long period of the periodic table.

14. The method of claim 12 in which the catalyst comprises ox bile and a water-soluble salt of a heavy metal occurring in the 6th to 12th positions of the first long period of the periodic table.

15. The method of claim 12 in which the material polymerized is a mixture of butadiene-1,3 and acrylonitrile and the catalyst comprises ox bile and a water-soluble cobalt salt.

16. The method of claim 12 in which the material polymerized is a mixture of butadiene-1,3 and acrylonitrile and the catalyst comprises ox bile and a water-soluble copper salt.

17. The method which comprises subjecting a mixture of a polymerizable conjugated butadiene and at least one other compound which contains a

group and is copolymerizable therewith in aqueous emulsion, to polymerization in aqueous emulsion in the presence of a catalyst comprising a complex compound of a heavy metal and a compound containing a cyclopentenophenanthrene ring having a substituent containing no elements other than oxygen and hydrogen at the $C_3$ position, a substituent containing no elements other than carbon, hydrogen and oxygen at the $C_{17}$ position and no substituents containing elements other than carbon, hydrogen and oxygen at other positions, the concentration of the complex compound being less than 2% by weight of the material polymerized and such that the polymerization proceeds more rapidly than in the absence of the complex compound.

18. The method of claim 17 wherein the heavy metal is a heavy metal occurring in the 6th to 12th positions of the first long period of the periodic table.

WILLIAM D. STEWART.

Certificate of Correction

Patent No. 2,380,477. July 31, 1945.

WILLIAM D. STEWART

It is hereby certified that error appears in the printed specification of the above numbered patent requiring correction as follows: Page 4, second column, line 26, claim 6, for "6th and 12th" read *6th to 12th*; and that the said Letters Patent should be read with this correction therein that the same may conform to the record of the case in the Patent Office.

Signed and sealed this 5th day of November, A. D. 1946.

[SEAL]

LESLIE FRAZER,
*First Assistant Commissioner of Patents.*